United States Patent
Choi et al.

(10) Patent No.: US 9,524,714 B2
(45) Date of Patent: Dec. 20, 2016

(54) SPEECH RECOGNITION APPARATUS AND METHOD THEREOF

(71) Applicant: SAMSUNG ELECTRONICS CO., LTD., Suwon-si (KR)

(72) Inventors: Sung-wook Choi, Suwon-si (KR); Sung-pil Hwang, Suwon-si (KR); Ji-won Yoo, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/596,690

(22) Filed: Jan. 14, 2015

(65) Prior Publication Data
US 2016/0034458 A1 Feb. 4, 2016

(30) Foreign Application Priority Data

Jul. 30, 2014 (KR) ........................ 10-2014-0097098

(51) Int. Cl.
*G10L 15/22* (2006.01)
*G10L 15/06* (2013.01)
*G10L 15/08* (2006.01)

(52) U.S. Cl.
CPC .......... *G10L 15/06* (2013.01); *G10L 2015/088* (2013.01)

(58) Field of Classification Search
CPC ............................ G06F 17/3043; G10L 15/08
USPC .......... 704/239, 240, 246, 247, 252
See application file for complete search history.

(56) References Cited

U.S. PATENT DOCUMENTS

| 2007/0106685 | A1* | 5/2007 | Houh ................ G06F 17/30796 |
| 2007/0168910 | A1* | 7/2007 | Radford ............. G06F 11/3616 717/101 |
| 2010/0169095 | A1  | 7/2010 | Asano |
| 2011/0161069 | A1* | 6/2011 | Staffel .................... G06Q 10/00 704/9 |
| 2015/0220836 | A1* | 8/2015 | Wilson ............... G06Q 30/0631 706/46 |

FOREIGN PATENT DOCUMENTS

JP 2011-203434 A 10/2011

* cited by examiner

*Primary Examiner* — Marcellus Augustin
(74) *Attorney, Agent, or Firm* — Sughrue Mion, PLLC

(57) ABSTRACT

There is provided a speech recognition controlling method which includes extracting a keyword by crawling a webpage, adding the keyword to a lexicon in which a plurality of words are registered and updating the lexicon, recognizing, in response to a user speech being input, the speech based on the updated lexicon, performing a search according to the recognized result, and displaying a result of the search.

28 Claims, 14 Drawing Sheets

FIG. 7

| DBS BROADCAST TABLE | | |
|---|---|---|
| 7.1(MONDAY) | | |
| TIME | PROGRAM TITLE | BROADCAST TIME |
| ---------- | (ABCDE)~72 | ---------- |
| ---------- | (FGHIJ)~73 | ---------- |
| ---------- | (KLMNO)~74 | ---------- |
| ---------- | (PQRST)~75 | ---------- |
| ---------- | (UVWXY)~76 | ---------- |
| ---------- | ⋮ | ---------- |
| ---------- | | ---------- |
| ---------- | | ---------- |

43

WEB CRAWLING AREA

70

SPEECH RECOGNITION APPARATUS AND METHOD THEREOF

CROSS-REFERENCE TO RELATED APPLICATION

This application claims priority from Korean Patent Application No. 10-2014-0097098 filed on Jul. 30, 2014 in the Korean Intellectual Property Office, the disclosure of which is incorporated herein by reference in its entirety.

BACKGROUND

1. Field

Apparatuses and methods consistent with exemplary embodiments relate to a speech recognition apparatus and a method thereof, and more particularly, to a speech recognition apparatus which recognizes a user's speech and a controlling method thereof.

2. Description of the Related Art

Electronic apparatuses having a speech recognition function have been used. Speech recognition is technology which recognizes a user's speech as a voice signal which corresponds to specific words. This technology can be used in various fields. In particular, controlling apparatuses using speech recognition technology is comparatively simple as compared to a related art in which a user needs to press a specific button using the finger or other means, and thus, this technology is widely used for various electronic apparatuses such as a digital television (TV), air-conditioner, home theater as well as personal computer (PC) and mobile communication apparatuses. For example, when a user wishes to watch a program titled 'ABC,' a user may input speech by saying 'turn on ABC,' a TV recognizes a voice signal of a user through a speech recognition module in the TV, a channel may be changed to a channel broadcasting the 'ABC' program.

In a related-art speech recognition technology, in order to rapidly recognize user speech, a lexicon of phonemes of words and a predetermined phoneme generation rule is used to recognize speech. However, there is a problem that new words may be desired to be recognized, and a speech recognition ratio will be reduced for the new words. In particular, it is likely that the newly words are keywords related to current issues or events, and that a user is interested in utilizing the issue keywords. However, the related-art speech recognition technology has a difficulty in that new keywords may only be added to the lexicon one by one, and, accordingly, the speech recognition ratio of new words of the speech recognition apparatus is limited.

Thus, there is a need for automatically learning issue keywords to improve the speech recognition ratio.

SUMMARY

One or more exemplary embodiments provide a speech recognition apparatus and a controlling method thereof which may extract an keyword from a webpage using web crawling and update a lexicon by adding the extracted keyword to a lexicon.

According to an aspect of an exemplary embodiment, there is provided a speech recognition controlling method which includes extracting a keyword by crawling a webpage, adding the keyword to a lexicon in which a plurality of words are registered and updating the lexicon, recognizing, in response to a user speech input, the speech based on the updated lexicon, performing a search according to the recognized result, and displaying a result of the search.

The extracting the keyword may include detecting one or more texts included in the webpage, counting a number of appearances of the detected texts, and extracting a text from among the detected texts of which the number of appearances exceeds a predetermined threshold as the keyword.

The extracting the keyword may include detecting one or more texts included in the webpage, and extracting a text from among the detected texts which is not previously registered in the lexicon as the keyword.

The extracting the keyword may include extracting a text which is disposed at a predetermined location on a layout of the webpage as the keyword.

The updating a lexicon may include assigning a weight according to a predetermined condition to the extracted keyword, calculating a search priority of the extracted keyword according to the assigned weight, and registering the extracted keyword to the lexicon based on the search priority.

The updating the lexicon may include categorizing and storing the extracted keyword according to a plurality of categories, and the recognizing the speech may include analyzing the speech to determine a category among the plurality of categories and searching for a word which corresponds to the speech from among words categorized in the determined category.

The extracting the keyword may include crawling the webpage on a predetermined cycle and extracting a new keyword from the webpage.

The recognizing the speech may include measuring a pronunciation similarity between a word included in the speech and keywords registered in the lexicon, searching for metadata for keywords of which the measured pronunciation similarity exceeds a predetermined value, and recognizing the speech by analyzing a meaning based on the metadata search result.

The method may further include updating a recognition history of a word included in the speech.

The method may further include receiving a remote control signal to change the webpage, changing and displaying the webpage according to the remote control signal, and extracting the keyword from the changed webpage.

The keyword may be an issue keyword indicating a new word or an important word which is frequently repeated.

According to an aspect of another exemplary embodiment, there is provided a speech recognition apparatus which includes a storage in which a lexicon to be used for speech recognition is stored, a communicator configured to, in response to a webpage being selected, access a source apparatus which provides the webpage and receive a data of the webpage, and a controller configured to, in response to the webpage data being received, crawl the webpage, extract an keyword from the web page, and update the lexicon by adding the keyword to the lexicon.

The controller may detect one or more texts included in the webpage, count a number of appearances of the detected texts, and extract a text from among the detected texts of which the number of appearances exceeds a predetermined threshold as the keyword.

The controller may detect one or more texts included in the webpage and extract a text from among the detected texts which is not previously stored in the lexicon as the keyword.

The controller may extract a text which is disposed on a predetermined location on a layout of the webpage as the keyword.

The controller may assign a weight according to a predetermined condition to the extracted keyword, calculate a search priority of the extracted keyword according to the assigned weight, and register the extracted keyword to the lexicon based on the search priority.

The controller may categorize and store the extracted keyword according to a plurality of categories, analyze the speech to determine a category among the plurality of categories, and search for a word which corresponds to the speech from among words categorized in a determined category.

The controller may crawl the webpage on a predetermined cycle and extract a new keyword from the webpage.

The controller may measure a pronunciation similarity between a word included in a speech and keywords registered in the lexicon, search for metadata for keywords of which the measured pronunciation similarity exceeds a predetermined value, and recognize the speech by analyzing a meaning based on the metadata search result.

The controller may, after recognizing a speech, update a recognition history of a word included in the speech.

The apparatus may further include a microphone configured to receive a speech, a receiver configured to receive a remote control signal, and a display, and the controller may control the display to display a webpage selected by the remote control signal, detect the keyword from the displayed webpage, and update the lexicon, and the controller may, in response to the speech being input through the microphone, recognize the speech based on the updated lexicon, perform a search according to the recognition results, and control the display to display a result of the search.

According to an aspect of another exemplary embodiment, there is provided lexicon updating method for a speech recognition apparatus, the method including: scanning at least one webpage; extracting at least one keyword from the webpage; and updating a lexicon by adding the keyword to the lexicon.

The at least one webpage may include a plurality of webpages, and the method may further include: determining the keyword by analyzing text contained among the plurality of webpages.

The at least one webpage may be a plurality of webpages, and the method may further include: determining the keyword by analyzing text contained among the plurality of webpages.

The method may further include determining a weight of the keyword based one at least one from among a reliability of the webpage, whether the keyword is a new keyword, a recognition history of the keyword, and a relevance of the keyword to a user.

A search priority of the keyword may be based on the weight

According to an aspect of another exemplary embodiment, there is provided a speech recognition apparatus which includes: a storage configured to store a lexicon for speech recognition; a communicator configured to receive webpage data of at least one webpage; and a controller configured to scan the webpage, extract at least one keyword from the webpage, and update the lexicon by adding the keyword to the lexicon.

The at least one webpage may include a plurality of webpages, and the controller may be further configured determine the keyword by analyzing text contained among the plurality of webpages.

The controller may be further configured determine a weight of the keyword based one at least one from among a reliability of the webpage, whether the keyword is a new keyword, and a recognition history of the keyword.

A search priority of the keyword is based on the weight.

BRIEF DESCRIPTION OF THE DRAWINGS

The above and/or other aspects will be more apparent by describing certain exemplary embodiments with reference to the accompanying drawings, in which:

FIGS. 5, 6 and 7 are views provided to explain a method for extracting an issue keyword by crawling a webpage according to various exemplary embodiments.

DETAILED DESCRIPTION

Figure 1:
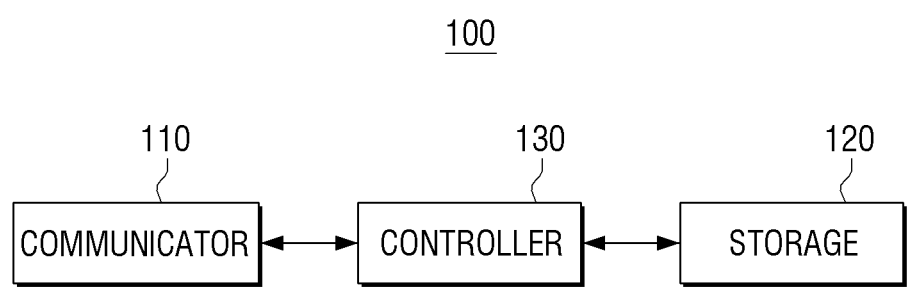
FIG. 1 is a block diagram schematically illustrating a configuration of a speech recognition apparatus according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments may be practiced without those specifically defined matters. Also, well-known functions or constructions are not described in detail because they would obscure the application with unnecessary detail.

FIG. 1 is a block diagram schematically illustrating a configuration of a speech recognition apparatus according to an exemplary embodiment.

Referring to FIG. 1, a speech recognition apparatus 100 according to an exemplary embodiment includes a communicator 110, a storage 120, and a controller 130.

The communicator 110 is configured to access a source apparatus which provides a webpage and receives webpage data. The communicator 110 may access a source apparatus through a network. Here, the network may be realized as all types of wire/wireless networks such as a local area network (LAN), wide area network (WAN), value added network (VAN), personal area network (PAN), mobile radio communication network, or satellite network. Accordingly, the speech recognition apparatus 100 may exchange data with a source apparatus which provides a webpage through the communicator 110, and receive a webpage from the source apparatus. Here, a webpage may include web documents based on hyper-text markup language (HTML), hierarchical temporal memory (HTM), active server page (ASP), and extensible markup language (XML). The source apparatus is a kind of computer which provides a webpage to the speech recognition apparatus 100 through the network.

The storage 120 is configured to store a lexicon which is used for recognizing speech. The lexicon may be a database in which a plurality of words and at least one phoneme corresponding to the plurality of words are stored in a pair. A phoneme may be automatically generated and stored according to a predetermined phoneme generation rule. Then, when speech from a user is input, the speech recognition apparatus 100 may recognize the speech which is input with reference to the phoneme stored in the lexicon. In particular, the storage 120 may store various modules to recognize the input speech.

The controller 130 controls overall operations of the speech recognition apparatus 100.

In particular, the controller 130, when the communicator 110 receives webpage data, may extract a keyword displayed on a webpage by scanning or crawling the webpage. Web crawling is commonly used by search engines. Here, a web crawler collects a new webpage or a renewed webpage and includes the webpages in an index of subjects to be searched. The webpage which is a subject of web crawling may be already registered or may be selected and registered by a user. The extracted keyword may be an issue keyword. An issue keyword indicates a new word or an important word which is frequently repeated, such as, as non-limiting examples, names of people drawing public attention, key words describing key events, or coined words. Accordingly, it is desirable to select a webpage to subject to web crawling from which a lot of issue keywords may be extracted. For example, a selected webpage may include a real-time search word page, a social network service (SNS) page, a broadcast schedule page, a viewer ratings page, a press agency's news page, and a personal blog.

In addition, the controller 130, when an issue keyword is extracted, may add the extracted issue keyword to the lexicon stored in the storage 120 and update the lexicon. When the extracted issue keyword is added to the lexicon, phonemes regarding the issue keyword may be automatically generated according to a predetermined phoneme generation rule and stored. Thereafter, the controller 130, when a stored issue keyword is included in the speech of a user, may rapidly recognize the issue keyword according to the generated phoneme.

In addition, the controller 130 may extract texts or terms included in a webpage and count a use of the extracted texts, and determine extracted texts of which the use meets a preset threshold to be an issue keyword. For example, when the preset threshold is 3, the use of the extracted texts may be respectively counted, and, if a specific text of the extracted texts is shown at least than three times, the specific text may be determined as an issue keyword.

In addition, the controller 130 may extract texts included in a webpage, and extract texts which are not registered to a lexicon as the issue keywords. As many of the texts which relate to current issues may not be registered in a lexicon, these keywords may be determined as the issue keywords regardless of term use.

For example, if a new program titled "Man from Star" is broadcasted, this program may be called "Man from Star" or "Man Star." If "Man from Star" and "Man Star" are included in a webpage, "Man from Star" and "Man Star" are texts which are not registered in a lexicon, and thus, they may be considered issue keywords. Therefore, "Man from Star" and "Man Star" may be added to a lexicon, and, if a user says "Man from Star," the controller 130 may recognize "Man from Star" as one without separating "Man from Star" into individual words. When a user says "Man Star," "Man Star" may be recognized through the lexicon.

In addition, the controller 130 may extract the texts which are disposed on a preset location of a layout of the webpage as the issue keywords. In other words, by using information regarding a layout structure of the webpage which is received in advance, the controller 130 may limit an area to perform web crawling and extract issue keywords.

In addition, the controller 130 may assign a weight according to a preset condition with respect to the extracted issue keywords and determine search priority of the extracted issue keywords according to the assigned weight. Here, the preset condition may include whether or not the extracted issue keyword is new, whether the use is high or low, whether the source is reliable or not, and whether there is a recognition history of the issue keyword. Whether or not the extracted issue keyword is new indicates that the issue keyword is a new keyword which has not been registered. In this case, the keyword may have an extremely high weight and the search priority may be ranked higher. The use indicates the number of the issue keywords being cited. The higher the use is, the higher the weight may be. The source indicates a webpage from which the issue keyword is extracted. In other words, depending on whether a source of the webpage is reliable, different weights may be assigned. For example, the weight may be highest for real-time search word pages of portal sites, and lower, in order, for organization tables of broadcasting stations or audience ratings pages, news pages of press agencies, and SNS, or personal blogs. In the case of issue keywords from multiple sources, the weight of the most reliable source may be used for the calculation. The recognition history indicates whether or not the issue keyword has been spoken by a user, and, if search result of actual metadata is present, greater weight may be assigned. In addition, the controller 130 may assign weight according to the relevance of issue keywords to a user by analyzing user information. User information indicates information including a user's gender, age, occupation, and fields of interests, which may be prestored in the storage 120 or received from an external server. In general, the higher the relevance is, the higher the weight should be.

Then, the controller 130 may additionally register an issue keyword to a lexicon based on the assigned search priority. In other words, each issue keyword may be assigned a weight and may be registered in an order of search priority. Accordingly, when an issue keyword having the similar pronunciation with a word spoken by a user is registered, an issue keyword having higher weight may be recognized as a word spoken by a user.

In addition, the controller 130 may divide and store the extracted issue keywords into categories. The controller 130 may analyze the contents and structure of sentences and a layout of a webpage which includes an issue keyword, and determine categories of the extracted issue keyword. For example, when there is a sentence in a webpage saying "$2^{nd}$ episode of ABC will be broadcasted," the controller 130 may determine that ABC has a category of a broadcasting program using information on the words "$2^{nd}$ episode" and "broadcast" and the structure of the sentence. Accordingly, ABC may be categorized into and stored as a broadcasting program. Thereafter, the user speech may be analyzed in the same method, the corresponding category may be determined, and words which correspond to user speech may be searched from among the issue keywords which are classified as the same category.

In addition, the controller 130 may automatically crawl a webpage based on a preset cycle or period and extract a new issue keyword. For example, when a preset time approaches once every day, a user may set the speech recognition apparatus 100 to crawl the webpage. Accordingly, the controller 130 may automatically access the registered webpage address on a routine basis, and may crawl the accessed webpage, and thus, new keywords included in the updated contents of a designated website may be extracted and registered in a lexicon. Aside from the preset cycle, a user may directly control the apparatus to crawl webpages.

In addition, the controller 130 may measure a pronunciation similarity between the words included in speech and the issue keywords registered in the lexicon and search metadata of keywords whose measured pronunciation similarity is not less than a preset value. Metadata indicates data which is assigned to contents according to certain rules so that desired information may be searched for from among mass information. By using metadata, a user may easily search for desired data using a search engine, etc.

Then, the controller 130 may perform semantic analysis based on the metadata search result and recognize the speech. The semantic analysis includes analyzing an original sentence as it is, searching for contents to determine if there are contents having pronunciation similarity with the entire sentence, and, if there is content which has pronunciation similarity having greater similarity with some words of the original sentence, modifying the sentence to include the content, and analyzing this modified sentence. The semantic analysis module may determine which type of semantic analysis method would be appropriate based on the metadata search results for respective keywords.

In addition, the controller 130, after recognizing speech, may update the recognition history regarding words included in speech. Recognition history indicates a total number of recognitions of a specific word, that is, words which are often spoken by a user may have a higher weight and search priority.

By the various exemplary embodiments, the present inventive concept may accurately and rapidly recognize speech and provide a user with an appropriate search result.

Figure 2:
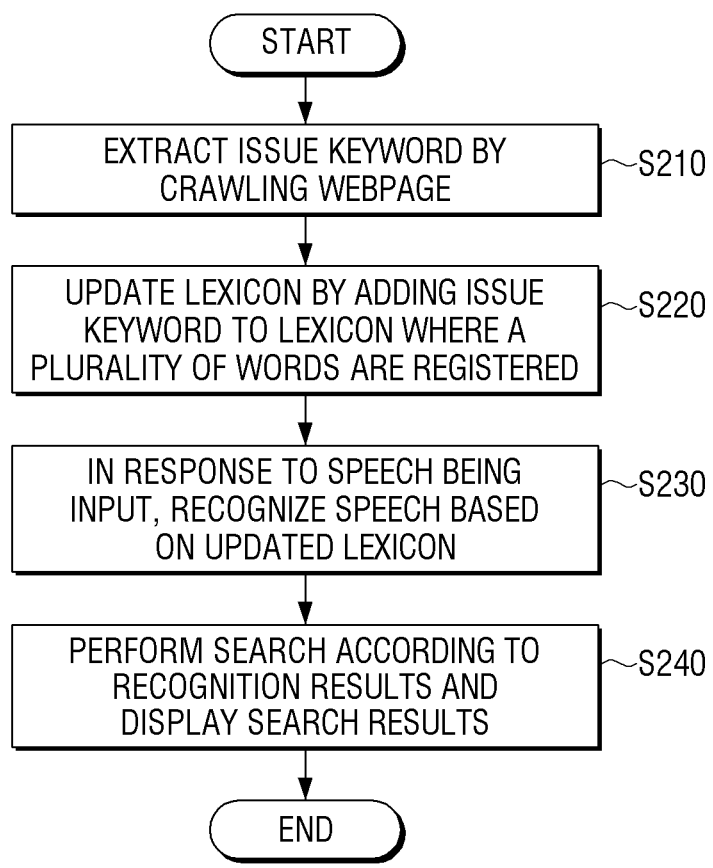
FIG. 2 is a flowchart provided to explain a method for controlling a speech recognition apparatus according to an exemplary embodiment.

FIG. 2 is a flowchart provided to explain a method for controlling a speech recognition apparatus according to an exemplary embodiment.

First of all, an issue keyword is extracted by crawling a webpage (S210). In this case, the webpage may include a real-time search word page, an SNS page, a broadcast schedule page, an audience rating page, a press agencies' news page, and a personal blog. A new issue keyword may be extracted by automatically crawling a webpage on a preset cycle. Then, by adding the issue keyword to a lexicon where a plurality of words is registered, a lexicon is updated (S220). When an issue keyword is added, phonemes regarding the issue keyword may be automatically generated and stored according to a preset phoneme generation rule. Regarding the extracted issue keyword, a weight may be assigned according to a preset condition, and search priority may be calculated. Here, a preset condition may include whether the extracted issue keyword is new, whether use is high or low, whether there is a recognition history, et cetera. In general, the newer the extracted issue keyword is, the higher the use is, the higher reliability of the source is, and the greater the recognition history, the higher the weight to be assigned. Further, the extracted issue keyword may be classified into categories and stored. Then, a user's speech is input, speech is recognized based on the updated lexicon (S230). At this time, by analyzing the speech, a word which corresponds to the speech may be searched for from among the issue keywords in a category which corresponds to the speech. At this time, recognition history of the words included in the speech may be updated. Thereafter, a search may be performed according to the recognition result of the speech, and the results may be displayed (S240).

Figure 3:
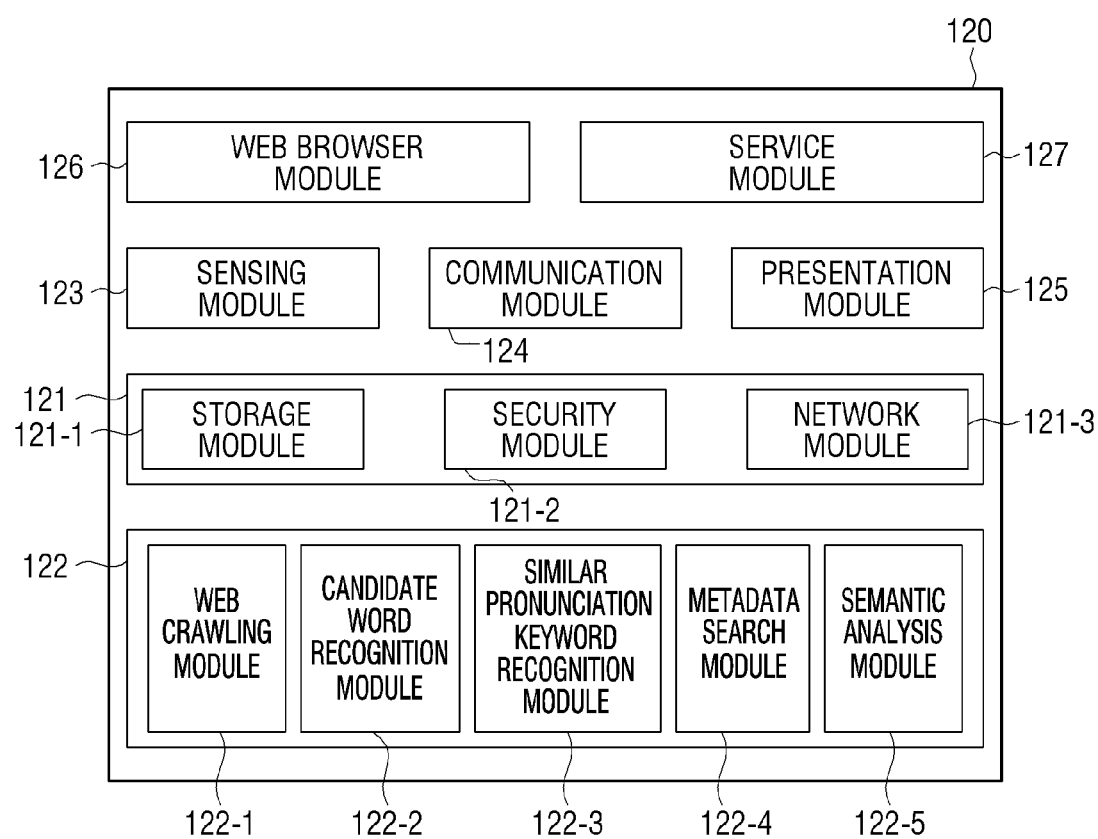
FIG. 3 is a block diagram illustrating a configuration of a storage in detail according to an exemplary embodiment.

FIG. 3 is a block diagram illustrating a configuration of a storage in detail according to an exemplary embodiment.

According to FIG. 3, in the storage 120, software which includes a base module 121, a speech recognition module 122, a sensing module 123, a communication module 124, a presentation module 125, a web browser module 126, and a service module 127 may be stored.

The base module 121 indicates a basic module which processes a signal delivered from hardware included in the speech recognition apparatus 100 and transmits the signal to a upper layer module. The base module 121 includes a storage module 121-1, a security module 121-2, and a network module 121-3, or the like. The storage module 121-1 is a program module which is a database manager (DM) or registry. The security module 121-2 is a program module which supports hardware certification, permission on request, and security storage, or the like, and the network module 121-3 is a module to support network connections, which include a DNET module and a UPnP module, or the like.

The speech recognition module 122 indicates a module for recognizing user speech. The speech recognition module 122 includes a web crawling module 122-1, a candidate word recognition module 122-2, a similar pronunciation keyword recognition module 122-3, a metadata search module 122-4, and a semantic analysis module 122-5, or the like. The web crawling module 122-1 is a program module which extracts texts included in a webpage by crawling a selected webpage, and extracts an issue keyword therefrom. This module can be programmed so that a webpage is crawled automatically on a preset cycle. The candidate word recognition module 122-2 is a program module which analyzes user speech and extracts a word which is a subject to recognition among spoken sentences. The similar pronunciation keyword recognition module 122-3 is a program module which measures a similarity between a word spoken by a user and an issue keyword registered in a lexicon, and extracts a keyword whose measured pronunciation similarity is greater than a preset value as a similar keyword. The metadata search module 122-4 is a program module which performs metadata search for extracted similar pronunciation keywords. The semantic analysis module 122-5 is a program module which performs semantic analysis based on metadata search results and recognizes user speech. The semantic analysis module 122-5 may determine which types of semantic analysis are desirable.

A sensing module 123 is a module which collects information from various sensors, and analyzes and manages the collected information.

The communication module 124 is a module for performing external communication. The communication module

124 may include a messaging module (not shown) and a telephone module (not shown).

A presentation module 125 is a module to compose a display screen when the speech recognition apparatus is equipped with a display. A presentation module 125 includes a multimedia module (not shown) to play and output multimedia contents and a user interface (UI) rendering module (not shown) which performs UI and graphic processing.

A web browser module 126 performs web browsing and accesses a web server. The web browser module 126 may include various modules (not shown) such as a web view module which constitutes a webpage, a download agent module which performs a download, a bookmark module, and a webkit module.

The service module 127 is a module which includes various applications (not shown) to provide various services. To be specific, the service module 127 may include various program modules including an SNS program, a content play program, a game program, an e-book program, a calendar program, an alarm management program, and other widgets.

Figure 4:
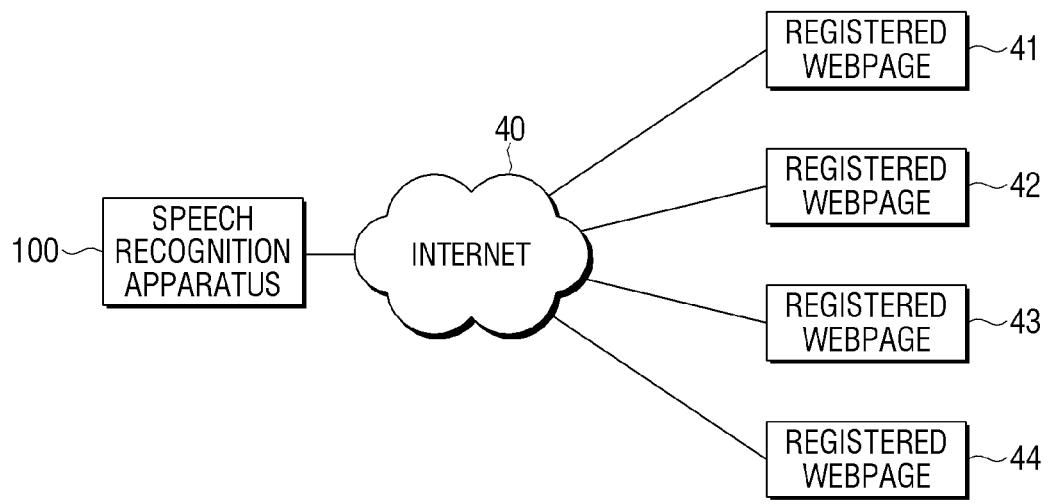
FIG. 4 is a view provided to explain a process for selecting a webpage for crawling according to an exemplary embodiment.

FIG. 4 is a view provided to explain a process for selecting a webpage for crawling according to an exemplary embodiment.

The speech recognition apparatus 100 may automatically crawl the webpages 41-44, which a user registers, through the internet 40. A uniform resource locator (URL) of a webpage, that is, a webpage address, is registered, by a user and the speech recognition apparatus 100 may read the contents of the webpage by automatically accessing the registered URL on a regular basis. The registered URLs and crawling cycle may be stored in the storage and managed. Accordingly, the speech recognition apparatus 100 may search for recently updated information of the automatically crawled webpage and extract a new issue keyword.

The registered webpage 41-44 may include a real-time search word page of portal sites, a social network service (SNS) page, a broadcast schedule table or audience rating page of broadcasting stations, a news page of a press agency, or a personal blog. Information on the layout of the registered webpage 41-44 may be prestored in the storage 120. For example, when the registered webpage 43 is a webpage where a broadcast schedule is included, an area of interest from which an issue keyword is to be extracted may be an area on a layout where titles of broadcasting programs are displayed. The speech recognition apparatus 100, by using information on the layout, may perform web crawling for the area where titles of the broadcast programs are displayed and extract an issue keyword from the area. In this case, the extracted issue keyword may be automatically categorized as a broadcast program.

In the above-described exemplary embodiment, there are four registered webpages, but the number of the registered webpages may be adjusted in a diverse manner according to a user setting.

Figure 5:
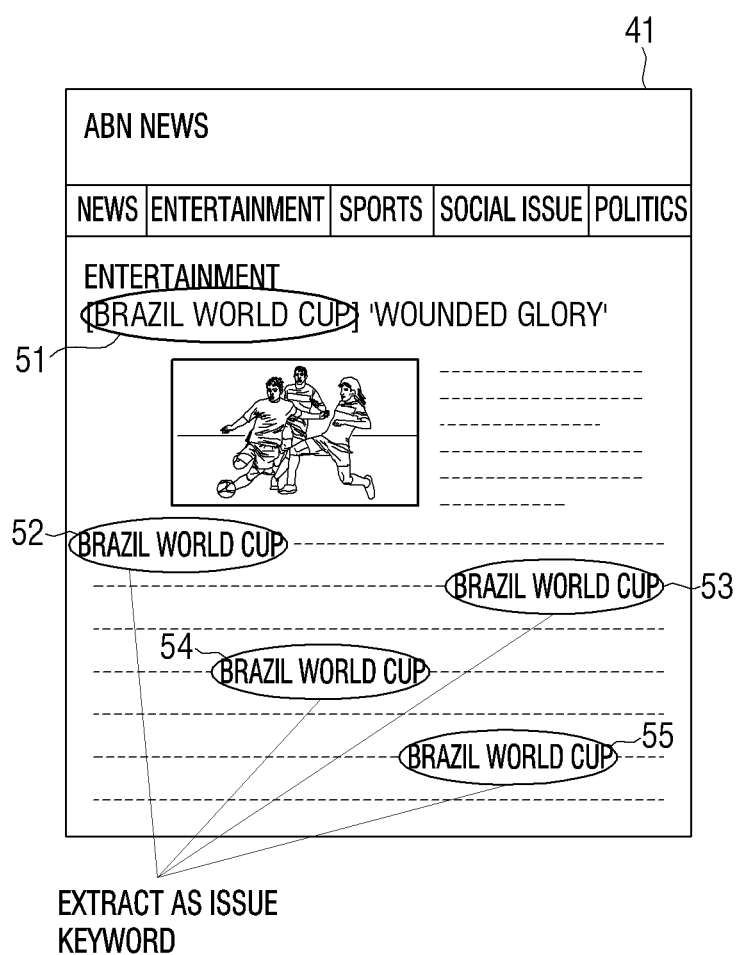
Figure 6:
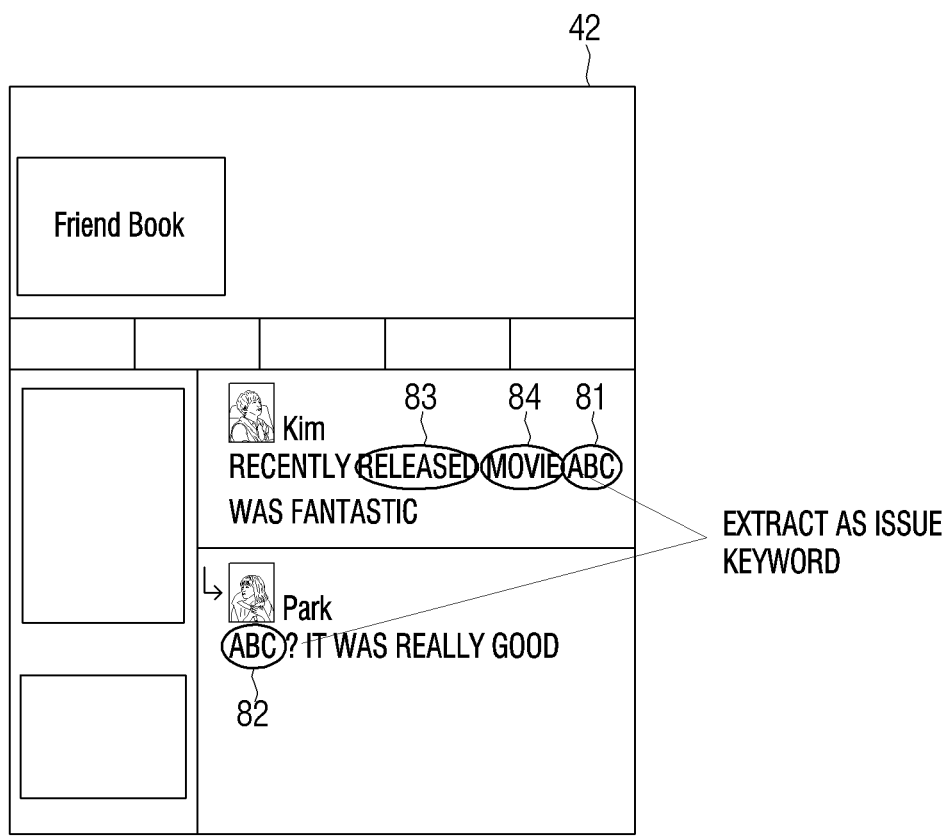

FIGS. 5-7 are views provided to explain a method for extracting an issue keyword by crawling a webpage according to various exemplary embodiments.

FIG. 5 illustrates a method for extracting an issue keyword when the webpage 41 is a news page of a press agency. As illustrated in FIG. 5, the speech recognition apparatus 100 may detect the all text included in the news page by crawling a news page. In this case, the speech recognition apparatus 100 may count a use of the detected text and extract a text whose use is greater than a threshold as an issue keyword. For example, when the preset threshold is 3, the use of 'Brazil World Cup' in FIG. 5 is 5 (51-55), and thus, 'Brazil World Cup' may be extracted as an issue keyword. In addition, the words 'Brazil' and 'World Cup' may be extracted as separate issue keywords.

Terms with higher use may be related to hot issues. As 'Brazil World Cup' appears 5 times, a search priority corresponding to 5 uses may be assigned to 'Brazil World Cup.' Accordingly, the calculated search priority of 'Brazil World Cup' and 'Brazil World Cup' may be registered to a lexicon. If 'Brazil World Cup' is already registered in a lexicon, a search priority of the lexicon may be updated.

In addition, a category of a news page is categorized as 'sports', and thus, it is highly likely that 'Brazil World Cup' has the same category. Accordingly, 'Brazil World Cup' may be classified into 'sports' and may be registered to a lexicon.

In the above-described exemplary embodiment, an example of counting the use of the texts detected in one webpage is described for convenience of explanation, but an issue keyword may be extracted by counting the use of the texts detected from a plurality of registered webpages.

FIG. 6 illustrates a method for extracting an issue keyword when the webpage 42 is an SNS. As illustrated in FIG. 6, in an SNS or webpage of a personal blog, dialogs between a user and friends may be displayed. The speech recognition apparatus 100 may detect all text included in the SNS page by crawling an SNS page. In this case, the speech recognition apparatus 100, from among the entire detected text, may extract an unregistered text as an issue keyword. For example, if a movie title 'ABC' (81, 82) is an unregistered text, the movie title 'ABC' (81, 82) may be extracted as an issue keyword.

The speech recognition apparatus 100 may analyze and register a certain dialog pattern in advance, and categorize and store a category of the issue keyword using the dialog pattern. The speech recognition apparatus 100, from among a sentence of a user Kim 'recently released movie ABC was fantastic!' may determine that 'ABC' (81, 82) is a movie title by using words such as 'released' (83) and 'movie' (84) and a pre-registered sentence pattern. Accordingly, 'ABC' (81, 82) may be classified into a 'movie' category and registered to a lexicon. Meanwhile, 'ABC' (81, 82) is a new word, and thus, may have a high weight. Therefore, the word may be ranked high on a search priority.

In the above-described exemplary embodiment, an example in which whether an issue keyword is new or not is used to calculate search priority has been explained, but the search priority may be calculated by considering other factors, such as whether the use is high or low and whether a source webpage is trustworthy or not.

FIG. 7 illustrates a method for extracting an issue keyword when a webpage is a broadcast table 43 or schedule of a website of a broadcasting station. As illustrated in FIG. 7, the speech recognition apparatus 100 may extract all text included in a webpage which includes the broadcast schedule by crawling the webpage which includes the broadcast schedule. In this case, the speech recognition apparatus 100 may extract a text which is positioned at a preset position on the layout of a webpage as an issue keyword. For example, in FIG. 7, an area of interest from which an issue keyword is extracted may be an area 70 on a layout in which titles 72-76 of the broadcasting programs are displayed. The speech recognition apparatus 100 may prestore information on a layout of the webpage in the storage 120, and perform web crawling only for the area 70 in which titles of broadcast programs are displayed. Accordingly, ABCDE 72, FGHIJ 73, KLMNO 74, PQRST 75, and UVWXY 76, which are texts within the area 70 in which titles are displayed, may be extracted as issue keywords.

The extracted issue keyword may be automatically classified as a broadcast program according to the prestored layout information. As described above, if layout information of a webpage is used, an issue keyword and a category of the issue keyword may be extracted easily.

Figure 8:
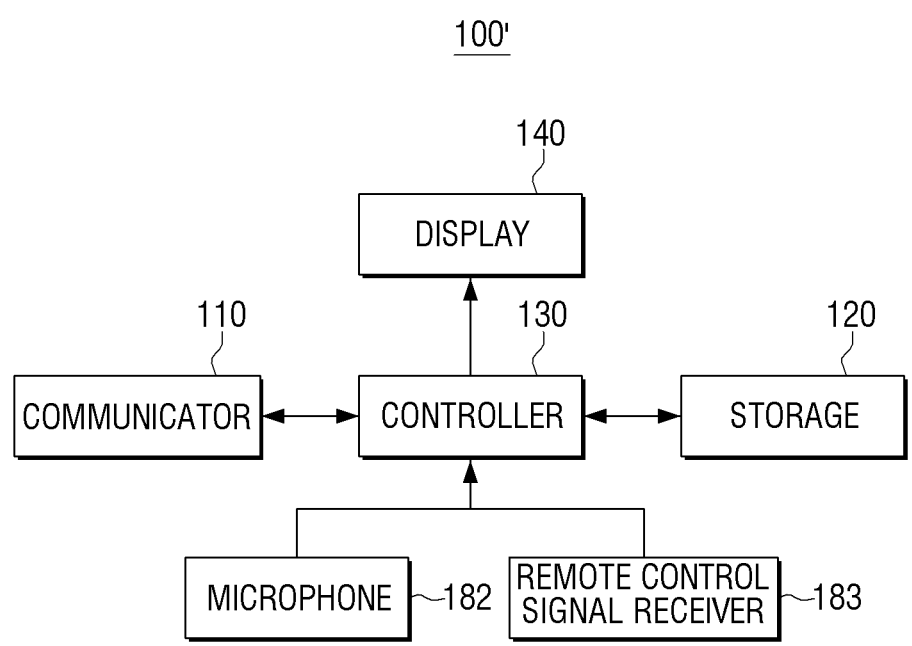
FIG. 8 is a block diagram schematically illustrating a configuration of a speech recognition apparatus according to another exemplary embodiment.

FIG. 8 is a block diagram schematically illustrating a configuration of a speech recognition apparatus according to another exemplary embodiment. As illustrated in FIG. 8, a speech recognition apparatus 100' according to another exemplary embodiment includes the communicator 110, the storage 120, the controller 130, the display 140, the microphone 182, and the remote control signal receiver 183. Hereinbelow, portions which overlap the disclosure of FIG. 1 will be omitted.

The display 140 displays results of searches performed according to recognition results. In particular, the display 140 may display information corresponding to user speech or display information for a user selection. For example, when search is performed according to recognition results, the search results may be displayed as a small thumbnail image at a lower end of the display 140.

The display 140 may be realized as Liquid Crystal Display (LCD), Organic Light Emitting Diodes (OLED), or the like, but is not limited thereto. In addition, the display 140 may be realized as a flexible display and a transparent display.

Accordingly, the speech recognition apparatus 100' may be realized as various types of apparatuses having display function such as a digital TV, personal computer (PC), Navigation device, Kiosk, Digital Information Display (DID), et cetera. When the speech recognition apparatus 100' is realized as a digital TV, the speech recognition apparatus 100' may be controlled by a remote controller. See FIG. 12.

A case where the speech recognition apparatus 100' is a digital television (TV) will be described. Exemplary embodiments are not limited thereto, and the speech recognition apparatus 100' may be realized, in addition to a digital TV which is a fixed apparatus, as various types of portable apparatuses such as a PMP, a tablet PC, and an e-dictionary which may process images.

A microphone 182 is configured to receive user speech. The controller 130 may perform control operation based on a user speech which is input through the microphone 182.

The remote control signal receiver 183 receives a signal from a remote controller 10. The speech recognition apparatus 100' may receive a signal of the remote controller 10 through the remote control signal receiver 183 and operation control may be performed. In order to control the operations of the speech recognition apparatus 100', when an operation command is input using the remote controller 10, an operation control signal may be delivered to the remote control signal receiver 183 which is provided on the speech recognition apparatus 100'. Then, the controller 130 which controls the operation of the speech recognition apparatus 100' may interpret a control signal transmitted from the remote control signal receiver 183 and control operations of the functional units according to a user command. The microphone 182 may be provided on the remote controller 10. In this case, a user may input speech through the microphone 182 provided on the remote controller 10, and the remote controller 10 may convert the spoken speech to a voice signal and transmit the voice signal to the remote control signal receiver 183.

The speech recognition apparatus 100' may receive a remote control signal from the remote controller 10, change a webpage which is subject to crawling according to the remote control signal, and display the changed webpage. In this case, from the displayed changed webpage, an issue keyword may be extracted, and a lexicon may be updated.

Figure 9:
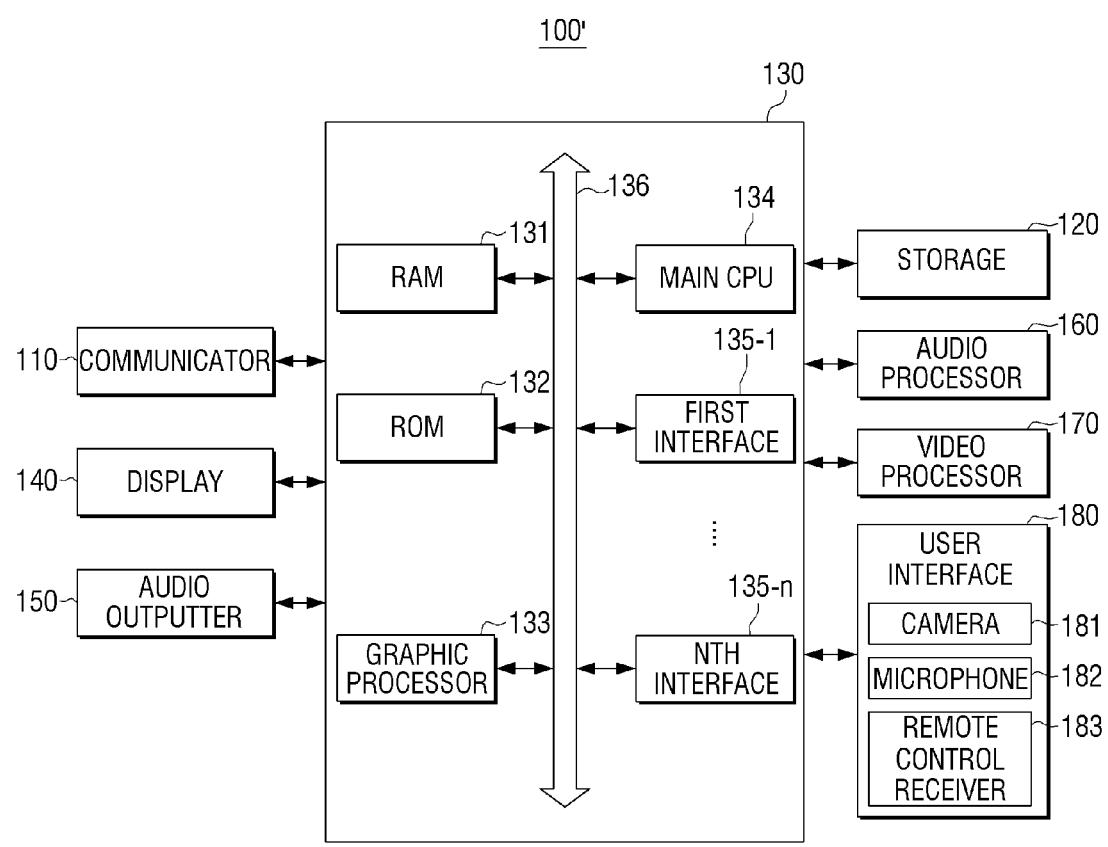
FIG. 9 is a block diagram illustrating a configuration of a speech recognition apparatus in detail according to another exemplary embodiment.

FIG. 9 is a block diagram illustrating a configuration of a speech recognition apparatus in detail according to another exemplary embodiment. As illustrated in FIG. 9, the speech recognition apparatus 100' according to another exemplary embodiment includes the communicator 110, the storage 120, the controller 130, the display 140, an audio outputter 150, an audio processor 160, a video processor 170, and a user interface 180. Hereinbelow, portions which overlap with the disclosure of FIGS. 1 and 8 will be omitted.

The communicator 110 has a configuration to communicate with various types of external apparatuses or an external server according to various types of communication methods. The communicator 110 may communicate with an external server and transmit contents corresponding to user speech to the speech recognition apparatus 100'. The communicator 110 may include various communication chips (not shown) including a WiFi chip, a Bluetooth chip, an NFC chip, and a wireless communication chip. In this case, the WiFi chip, Bluetooth chip, and NFC chip perform communication using WiFi method, Bluetooth method, and NFC method. Among them, the NFC chip, from among various RF-ID frequency bands such as 135 kHz, 13.56 MHz, 433 MHz, 860-960 MHz, 2.45 GHz, indicates a chip which operates with Near Field Communication (NFC) which uses a 13.56 MHz band. In a case when the WiFi chip or the Bluetooth chip is used, various connection information such as an SSID and a session key may be transmitted and received first and then communication is connected using this information, and various information may be transmitted and received. The wireless communication chip indicates a chip performing communication based on various communication specification such as IEEE, ZigBee, 3rd Generation (3G), 3rd Generation Partnership Project (3GPP), Long Term Evolution (LTE), et cetera.

The storage 120 stores various modules to operate the speech recognition apparatus 100'. A configuration of the storage 120 has been described in reference to FIG. 3, and thus will not be explained.

The controller 130 controls overall operations of speech recognition apparatus 100' using various modules stored in the storage 120.

The controller 130, as illustrated in FIG. 9, includes random-access memory (RAM) 131, read-only memory (ROM) 132, graphic processor 133, main central processing unit (CPU) 134, 1st to nth interface 135-1-135-n, and bus 136. In this case, the RAM 131, ROM 132, graphic processor 133, main CPU 134, 1st to nth interface 135-1-135-n may be interconnected through the bus 136.

In the ROM 131, a command set for system booting is stored. The main CPU 134 copies various applications stored in the storage 120 to the RAM 131, executes application programs copied to the RAM 131, and performs various operations.

The graphic processor 133, by using a calculator (not illustrated) and a rendering unit (not illustrated), generates a screen including various objects such as an icon, an image, and a text. The calculator calculates attribute values such as coordinate value, type, sizes, and colors according to the layout of a screen. The renderer generates a screen of various layouts including an object based on calculated attribute value.

The main CPU 134, by accessing the storage 120, performs booting using an O/S stored in the storage 120. The main CPU 134 performs various operations using programs, contents, and data stored in the storage 120.

The 1st to nth interface 135-1 to 135-n are connected to the above-described components. One of the interfaces may be a network interface which is connected to an external apparatus using network.

The audio outputter 150 is configure to output not only audio data processed by the audio processor 160 but also various alarm sounds and voice messages. In particular, the audio outputter 150 may be realized as a speaker, but this is merely exemplary, and the audio outputter may be realized as another audio outputter such as an audio output terminal.

The audio processor 160 is a component which processes audio data. In the audio processor 160, various processes such as decoding, amplification, and nose filtering of audio data may be performed. The audio processor 160 may have a module for audio processing to analyze and process user speech.

The video processor 170 is a component which processes contents received from the communicator 110. In the video processor 170, various image processing such as decoding, scaling, noise filtering, frame rate conversion, and resolution conversion related to contents may be performed. The video processor 170 may have a video processing module to process a video corresponding to contents.

The user interface 180 is configured to detect user interaction to control overall operations of the speech recognition apparatus 100'. In particular, the user interface 180, as illustrated in FIG. 9, may include various interaction detection apparatuses such as a camera 181, a microphone 182, and a remote control signal receiver 183.

The speech recognition apparatus 100' may access a source apparatus which provides a webpage via a network using the communicator 110, and receive webpage data. In the above-described storage 120, a lexicon to be used for voice recognition is stored, and the speech recognition apparatus 100' may add an issue keyword which is extracted by crawling a received webpage to the lexicon, and update the lexicon. The speech recognition apparatus 100', by comparing pronunciation similarity between a word registered in a lexicon through the speech recognition module 122 stored in the storage 120 and a word included in a user speech which is received through the microphone 182, may recognize a user speech. When speech is recognized, search result may be displayed through the display 140. In other words, the speech recognition apparatus 100', as described above, may be realized as one user terminal apparatus which includes the communicator 110, the storage 120, the controller 130, the display 140, the microphone 182, and the remote control signal receiver 183.

Figure 10A:
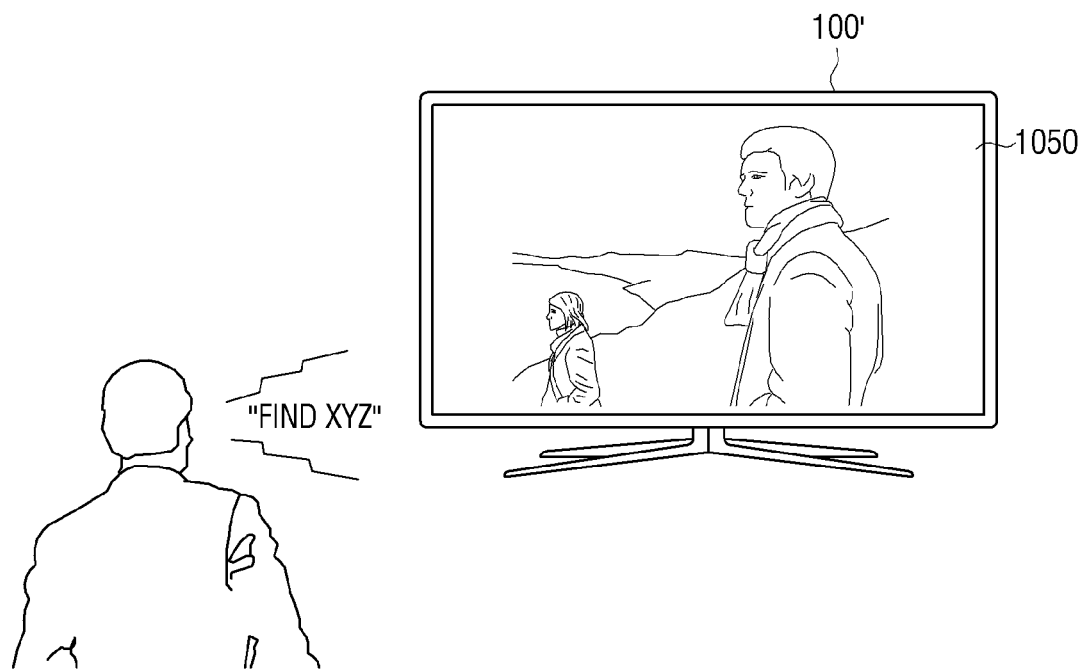
FIGS. 10A and 10B are views provided to explain a process for recognizing a speech of a user and displaying a search result, according to an exemplary embodiment.
Figure 10B:
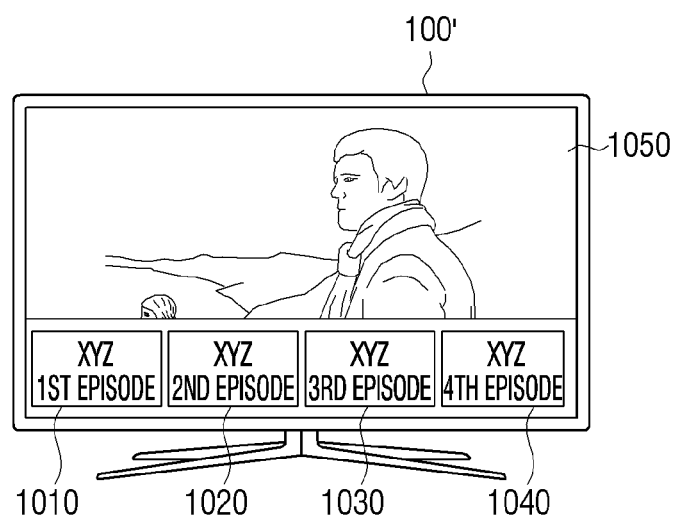

FIGS. 10A and 10B are views provided to explain a process for recognizing a speech of a user and displaying a search result, according to an exemplary embodiment.

As illustrated in FIG. 10A, when contents 1050 are displayed on the speech recognition apparatus 100', a user may desire to view a program titled "XYZ." In this case, a user may input a command to the speech recognition apparatus 100' by saying "Find XYZ." When the command is input, the speech recognition apparatus 100', through a prestored lexicon or sentence pattern, may recognize two words such as "XYZ" and "find," search for a program regarding "XYZ," and display the program on a screen. The "XYZ" program may replace contents 1050 currently displayed. In addition, as illustrated in FIG. 10B, a search result of a program relating to "XYZ" may be generated as a thumbnail images 1010-1040 at a lower end of the display 140 so as not to interfere with viewing of the contents 1050.

A user may select a generated thumbnail image 1010-1040, to perform a detailed selection on the program regarding "XYZ".

Figure 11:
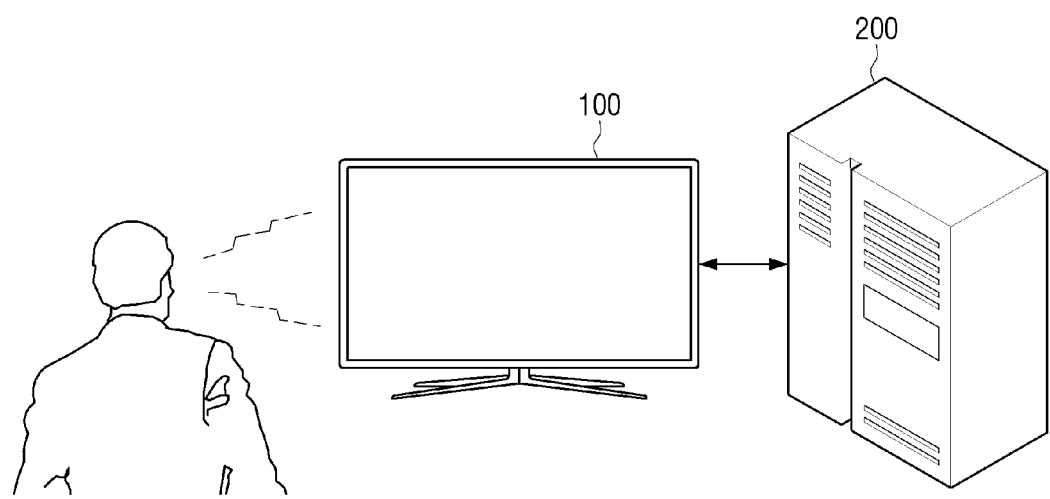
FIG. 11 is a view provided to explain a method for recognizing speech of a speech recognition apparatus according to another exemplary embodiment.

FIG. 11 is a view provided to explain a method for recognizing speech of a speech recognition apparatus according to another exemplary embodiment.

According to FIG. 11, the speech recognition apparatus 100 may be connected to an external speech recognition control server 200 via a network and perform speech recognition.

The speech recognition control server 200 controls speech recognition of the speech recognition apparatus 100. To do this, the speech recognition control server 200 receives a speech recognition request signal from the speech recognition apparatus 100 through the network and transmits a response signal corresponding to the received speech recognition request signal to the speech recognition apparatus 100.

The speech recognition control server 200 may receive a webpage from a source which provides a webpage through an internet network or the like, and transmit the webpage to the speech recognition apparatus 100 having the display 140, and enable the speech recognition apparatus 100 to receive and display the webpage. Further, the speech recognition control server 200 may include a plurality of speech recognition engines and recognize a user speech. The speech recognition apparatus 100 may transmit speech data to the speech recognition control server 200, and receive result information on the transmitted speech data. That is, the speech recognition control server 200 may perform search based on recognition results and transmit the results of the search to the speech recognition apparatus 100. Alternatively, some or all of the capabilities of the speech recognition control server 200 may be included in the speech recognition apparatus 100.

Figure 12:
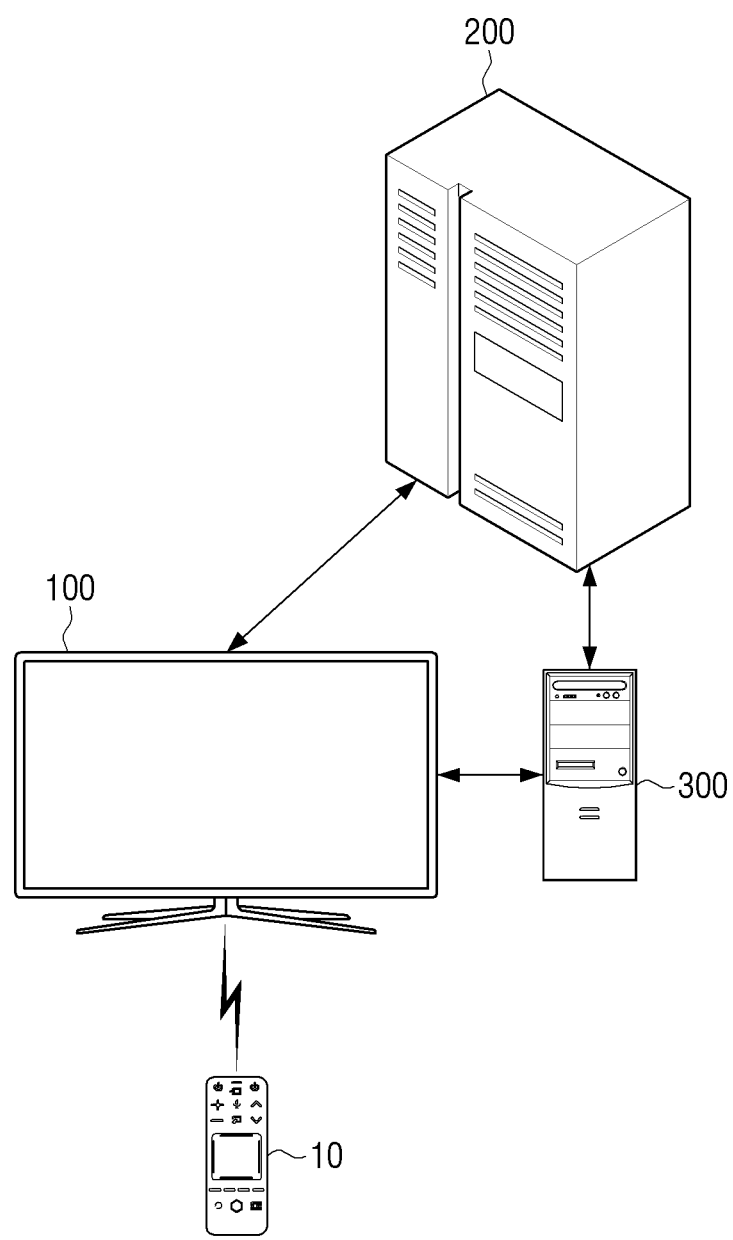
FIG. 12 is a view provided to explain a method for recognizing speech of a speech recognition apparatus according to another exemplary embodiment.

FIG. 12 is a view provided to explain a method for recognizing speech of a speech recognition apparatus according to another exemplary embodiment.

According to FIG. 12, the speech recognition apparatus 100 may perform speech recognition by being connected to the external speech recognition control server 200 and a dialog server apparatus 300 via a network. To do this, the speech recognition control server 200 and the dialog-type server apparatus 300 include a communicator including various communication modules.

The dialog-type server apparatus 300 may receive user speech and provide a speech recognition service. The speech recognition control server 200 may perform speech recognition regarding user speech transmitted from the dialog type server apparatus 300, and transmit speech recognition results to the server apparatus 300. The dialog type server apparatus 300 may be a computing apparatus such as a desktop computer, laptop computer, tablet PC, personal digital assistant (PDA), mobile phone, satellite phone, wireless phone, session initiation protocol (SIP), Wireless Local Loop (WLL) station, smartphone, wireless computing apparatus including a hand-held apparatus having other wireless connection functions or a processing apparatus which is connected to a wireless modem. The dialog-type server apparatus 300 may receive a voice signal recognized from the speech recognition control server 200, generate a corresponding response message or inquiry message, and transmit them to the speech recognition apparatus 100. To do this, the dialog-type server apparatus 300 may include a storage which stores a response message corresponding to the voice signal and an inquiry message. The speech recognition apparatus 100 may perform processing according to a received response message or inquiry message. When the speech recognition apparatus 100 includes the display, the received response message or inquiry message may be displayed. Alternatively, some or all of the capabilities of the dialog-type server apparatus 300 may be included in the speech recognition apparatus 100.

Figure 13:
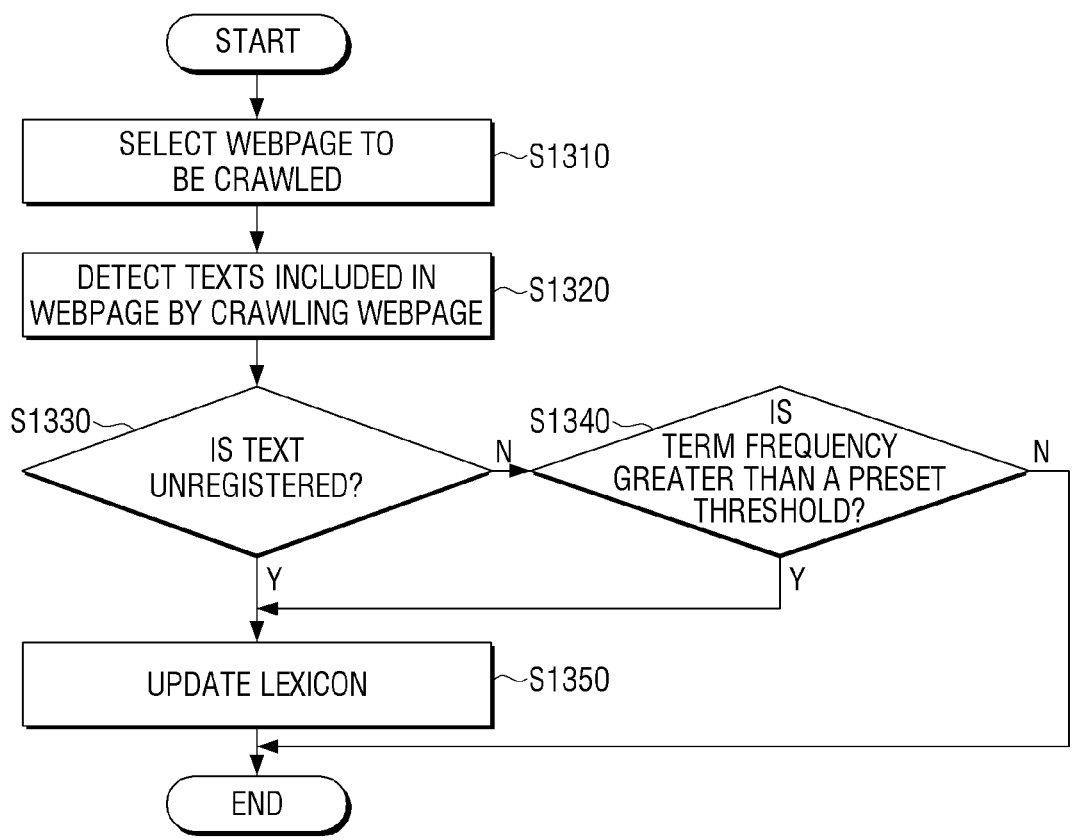
FIG. 13 is a flowchart provided to explain a controlling method of a speech recognition apparatus according to another exemplary embodiment.

FIG. 13 is a flowchart provided to explain a controlling method of a speech recognition apparatus according to another exemplary embodiment.

First of all, when a webpage which is to be crawled is selected (S1310), the selected webpage is crawled, and a text included in the webpage is detected (S1320). The webpage to be crawled may be pre-registered or selected by a user and registered. The webpage which is subject to web crawling may include a real-time search word page of portal sites, an SNS page, a broadcast schedule page, an audience rating page, a news page of press agency, a personal blog, or the like. An issue keyword may be extracted by crawling text positioned at a preset location on a layout of the webpage. Next, whether or not the detected texts are unregistered in a lexicon is determined (S1330). If it is determined that the texts are unregistered texts (S1330:Y), the texts may be determined as issue keywords, and added to a lexicon, and the lexicon may be updated (S1350). If it is determined that the texts are registered texts (S1330:N), whether or not the use of the texts is greater than a threshold needs to be additionally determined (S1340). If it is determined that use is greater than a preset threshold (S1340:Y), the texts may be determined as issue keywords, and added to a lexicon and the lexicon may be updated (S1350). If it is determined that the use is less than a preset threshold (S1340:N), it will be determined that no issue keyword is present in a webpage, and a lexicon will not be updated. In this case, a webpage may be automatically crawled on a preset cycle and the same process may be performed repeatedly.

Figure 14:
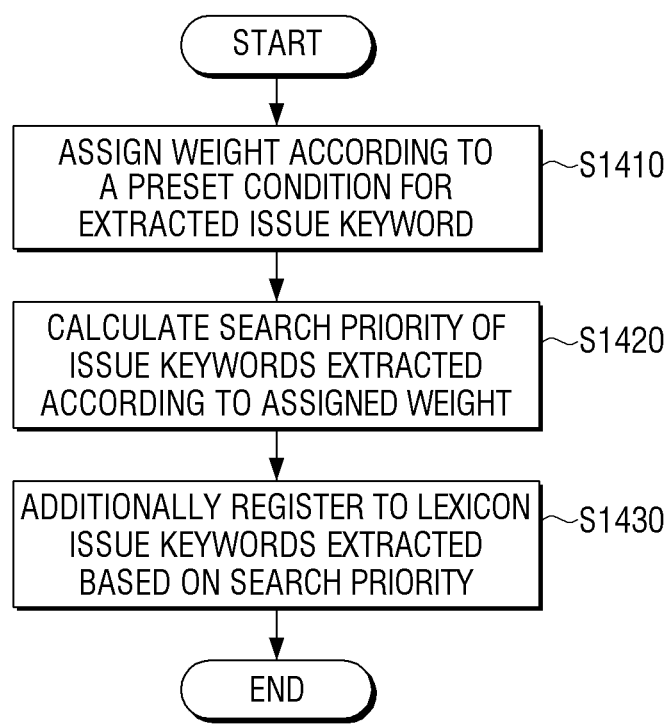
FIG. 14 is a flowchart provided to explain a method for updating a lexicon according to an exemplary embodiment.

FIG. 14 is a flowchart provided to explain a method for updating a lexicon according to an exemplary embodiment.

First of all, with respect to the extracted issue keyword, a weight is assigned according to a preset condition (S1410). In this case, the preset condition may include whether the extracted issue keyword is new, whether the use is high or low, whether the source webpage is reliable, whether there is a recognition history of the keyword, or the like. In general, the newer the extracted issue keyword is, the higher the use is, the higher the reliability of the source is, and the greater the recognition history is, the higher the weight will be given.

At S1420, the search priority is calculated according to a weight which is assigned to extracted issue keywords. The search priority may be calculated by integrating weights according to a preset condition. An issue keyword with higher search priority may have a higher probability to be recognized as a user spoken word compared to an issue keyword with a lower search priority. Then, based on search priority, the extracted issue keyword is additionally registered to a lexicon (S1430). If the extracted issue keyword has already been registered in a lexicon, search priority of a lexicon may be updated according to weight value.

A controlling method of the speech recognition apparatus according to the above-described various exemplary embodiments may be realized as a program and provided to the speech recognition apparatus.

For example, a non-transitory computer readable medium which includes extracting an issue keyword by crawling a webpage, updating the lexicon by adding an issue keyword to a lexicon where a plurality of words are registered, recognizing speech based on a updated lexicon in response to user speech being input, performing search based on recognition results, and displaying the search results may be provided.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as, as non-limiting examples, compact disc (CD), digital video disk (DVD), hard disk, Blu-ray disk, Universal Serial Bus (USB) flash drive, memory card, and read-only memory (ROM).

The foregoing embodiments and advantages are merely exemplary and are not to be construed as limiting. The present teachings may be readily applied to other types of apparatuses and methods. Also, the description of the exemplary embodiments of the present inventive concept is intended to be illustrative, and not to limit the range of the claims, and many alternatives, modifications, and variations will be apparent to those skilled in the art.

What is claimed is:

1. A speech recognition controlling method comprising:
    extracting a keyword by crawling a webpage;
    adding the keyword to a lexicon in which a plurality of words are registered and updating the lexicon;
    recognizing, in response to a user speech input, the speech based on the updated lexicon;
    performing a search according to the recognized speech;
    displaying a result of the search;
    receiving a remote control signal to change the webpage;
    changing and displaying the webpage according to the remote control signal; and
    extracting the keyword from the changed webpage.

2. The speech recognition controlling method of claim 1, wherein the extracting the keyword comprises:
    detecting one or more texts included in the webpage;
    counting a number of appearances of the detected texts; and
    extracting a text, from among the detected texts, of which the number of appearances exceeds a predetermined threshold as the keyword.

3. The speech recognition controlling method of claim 1, wherein the extracting the keyword comprises:
    detecting one or more texts included in the webpage; and
    extracting a text, from among the detected texts, which is not previously registered in the lexicon as the keyword.

4. The speech recognition controlling method of claim 1, wherein the extracting the keyword comprises extracting a text which is disposed at a predetermined location on a layout of the webpage as the keyword.

5. The speech recognition controlling method of claim 1, wherein the updating the lexicon comprises:
    assigning a weight according to a predetermined condition to the extracted keyword;
    calculating a search priority of the extracted keyword according to the assigned weight; and
    registering the extracted keyword to the lexicon based on the search priority.

6. The speech recognition controlling method of claim 1, wherein the updating the lexicon comprises categorizing and storing the extracted keyword according to a plurality of categories, and
    wherein the recognizing the speech comprises:
        analyzing the speech to determine a category among the plurality of categories; and searching for a word which corresponds to the speech from aiming words categorized in the determined category.

7. The speech recognition controlling method of claim 1, wherein the extracting the keyword comprises crawling the webpage on a predetermined cycle and extracting a new keyword from the webpage.

8. The speech recognition controlling method of claim 1, wherein the recognizing the speech comprises:
measuring a pronunciation similarity between a word included in the speech and keywords registered in the lexicon;
searching for metadata for keywords of which the measured pronunciation similarity exceeds a predetermined value; and
recognizing the speech by analyzing a meaning based on the metadata search result.

9. The speech recognition controlling method of claim 1, further comprising:
updating a recognition history of a word included in the speech.

10. The speech recognition controlling method of claim 1, wherein keyword is an issue keyword indicating a new word or an important word which is frequently repeated.

11. A speech recognition apparatus comprising:
a display;
a storage in which a lexicon to be used for speech recognition is stored;
a communicator configured to, in response to a webpage being selected, access a source apparatus which provides the webpage and receive a data of the webpage;
a microphone configured to receive a speech; and
a controller configured to, in response to the webpage data being received, crawl the webpage, extract a keyword from the webpage, and update the lexicon by adding the keyword to the lexicon,
wherein the controller is further configured to control the display to display a webpage selected by a remote control signal, to extract the keyword from the displayed webpage and to update the lexicon using the extracted keyword, and
wherein the controller is further configured to, in response to the speech being input through the microphone, recognize the speech based on the updated lexicon, perform a search according to the recognized speech, and control the display to display a result of the search.

12. The speech recognition apparatus of claim 11, wherein the controller is further configured to detect one or more texts included in the webpage, count a number of appearances of the detected texts, and extract a text, from among the detected texts, of which the number of appearances exceeds a predetermined threshold as the keyword.

13. The speech recognition apparatus of claim 11, wherein the controller is further configured to detect one or more texts included in the webpage and extract a text, from among the detected texts, which is not previously stored in the lexicon as the keyword.

14. The speech recognition apparatus of claim 11, wherein the controller is further configured to extract a text which is disposed on a predetermined location on a layout of the webpage as the keyword.

15. The speech recognition apparatus of claim 11, wherein the controller is further configured to assign a weight according to a predetermined condition to the extracted keyword, calculate a search priority of the extracted keyword according to the assigned weight, and register the extracted keyword to the lexicon based on the search priority.

16. The speech recognition apparatus of claim 11, wherein the controller is further configured to categorize and store the extracted keyword according to a plurality of categories, analyze the speech to determine a category among the plurality of categories, and search for a word which corresponds to the speech from among words categorized in a determined category.

17. The speech recognition apparatus of claim 11, wherein the controller is further configured to crawl the webpage on a predetermined cycle and extract a new keyword from the webpage.

18. The speech recognition apparatus of claim 11, wherein the controller is further configured to measure a pronunciation similarity between a word included in a speech and keywords registered in the lexicon, search for metadata for keywords of which the measured pronunciation similarity exceeds a predetermined value, and recognize the speech by analyzing a meaning based on the metadata search result.

19. The speech recognition apparatus of claim 11, wherein the controller is further configured to, after recognizing a speech, update a recognition history of a word included in the speech.

20. The speech recognition apparatus according to claim 11, further comprising:
a receiver configured to receive a remote control signal.

21. A lexicon updating method for a speech recognition apparatus, the lexicon updating method comprising:
scanning at least one webpage;
extracting at least one keyword from the webpage;
updating a lexicon by adding the keyword to the lexicon;
receiving a remote control signal to change the webpage;
changing and displaying the webpage according to the remote control signal; and
extracting the keyword from the changed webpage.

22. The lexicon updating method according to claim 21, wherein the at least one webpage comprises a plurality of webpages, the method further comprising:
determining the keyword by analyzing text contained in the plurality of webpages.

23. The lexicon updating method according to claim 21, further comprising:
determining a weight of the keyword based one at least one from among a reliability of the webpage, whether the keyword is a new keyword, a recognition history of the keyword, and a relevance of the keyword to a user.

24. The lexicon updating method according to claim 23 wherein a search priority of the keyword is based on the weight.

25. A speech recognition apparatus, the apparatus comprising:
a display;
a storage configured to store a lexicon for speech recognition;
a communicator configured to receive webpage data of at least one webpage;
a microphone configured to receive a speech; and
a controller configured to scan the webpage, extract at least one keyword from the webpage, and update the lexicon by adding the keyword to the lexicon,
wherein the controller is further configured to control the display to display a webpage selected by a remote control signal, to extract the keyword from the displayed webpage and to update the lexicon using the extracted keyword, and wherein the controller is further configured to, in response to the speech being input through the microphone, recognize the speech based on the updated lexicon, perform a search according to the recognized speech, and control the display to display a result of the search.

26. The apparatus according to claim 25, wherein the at least one webpage comprises a plurality of webpages, and wherein the controller is further configured determine the keyword by analyzing text contained in the plurality of webpages.

27. The apparatus according to claim 25, wherein the controller is further configured determine a weight of the keyword based one at least one from among a reliability of the webpage, whether the keyword is a new keyword, a recognition history of the keyword, and a relevance of the keyword to a user.

28. The apparatus according to claim 27, wherein a search priority of the keyword is based on the weight.

\* \* \* \* \*